United States Patent [19]

Jarlsson

[11] Patent Number: 5,183,283
[45] Date of Patent: Feb. 2, 1993

[54] APPARATUS FOR LIMITING LATERAL MOVEMENT IN TRAILERS

[76] Inventor: Assai Jarlsson, Kinnarps AB, Box 3060, S521 03 Falkoping, Sweden

[21] Appl. No.: 429,931

[22] Filed: Nov. 1, 1989

[51] Int. Cl.⁵ .............................................. B62D 13/02
[52] U.S. Cl. .................................... 280/426; 280/81.6; 280/442
[58] Field of Search ............... 280/442, 426, 419, 113, 280/117, 133, 112.2, 716, 81.6; 180/235; 74/417

[56] References Cited

U.S. PATENT DOCUMENTS

| | | | |
|---|---|---|---|
| 1,150,727 | 8/1915 | Alexander | 280/117 X |
| 2,135,291 | 11/1938 | Pinard | 280/113 X |
| 2,168,147 | 8/1939 | Arehart | 280/113 |
| 3,608,927 | 9/1971 | Grosseau | 280/716 |
| 3,761,109 | 9/1973 | Campbell | 280/716 |
| 4,405,147 | 9/1983 | Horsman et al. | 280/442 X |
| 4,484,758 | 11/1984 | Murray et al. | 280/442 |
| 4,621,830 | 11/1986 | Kanai | 280/716 X |

FOREIGN PATENT DOCUMENTS 3207724 9/1983 Fed. Rep. of Germany ...... 280/442

*Primary Examiner*—Mitchell J. Hill
*Attorney, Agent, or Firm*—Cushman, Darby & Cushman

[57] ABSTRACT

A device for controlling lateral forces acting on trailers' non-drive axles by utilizing two slewing brackets mounted with one on each side of the trailer chassis so as to control the non-driving axle of a trailer and cause that axle to move in the same direction as the direction being taken by the towing vehicle.

9 Claims, 4 Drawing Sheets

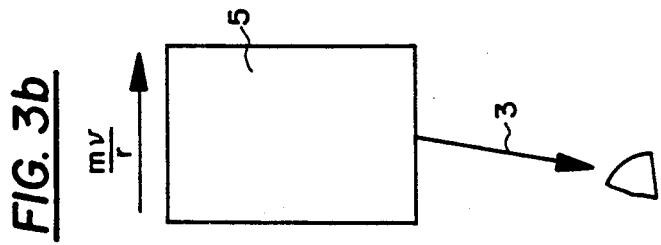
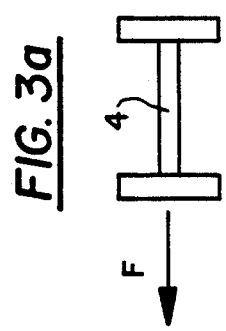
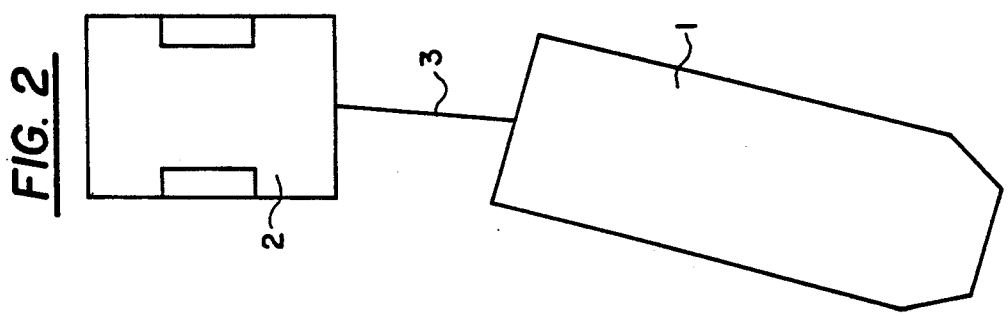
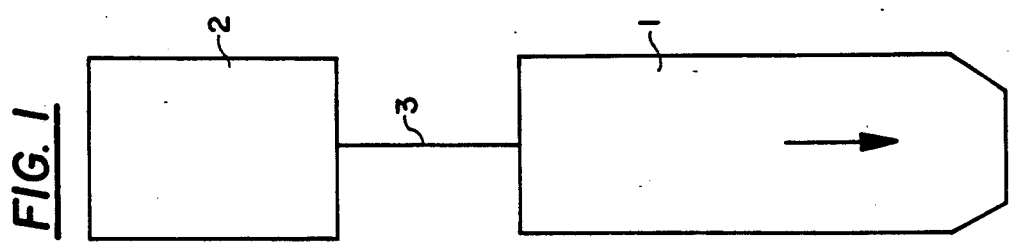

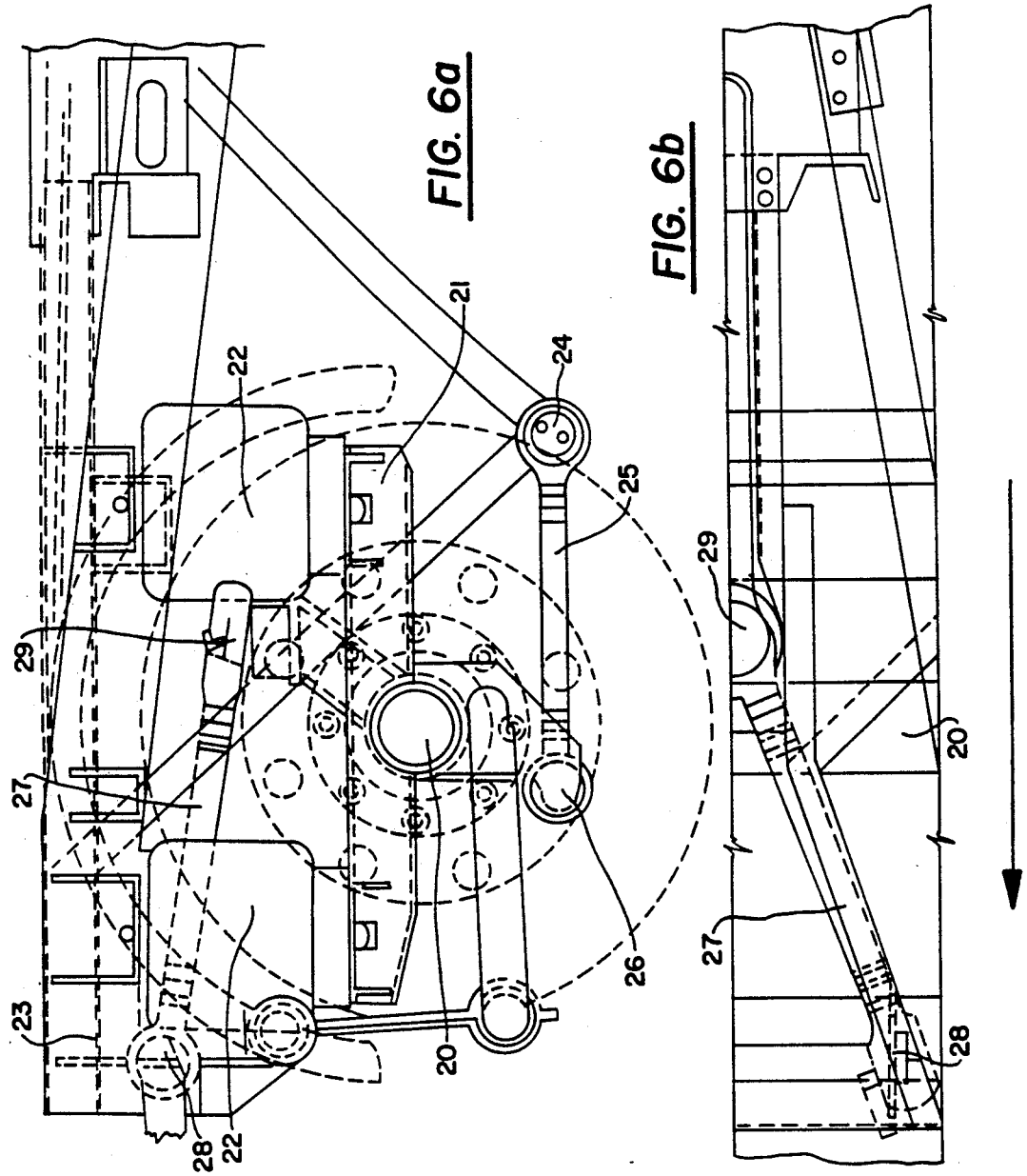

APPARATUS FOR LIMITING LATERAL MOVEMENT IN TRAILERS

The present invention relates to an apparatus for limiting lateral movement in trailers. More particularly, the device is related to employing slewing brackets mounted one on each side of a trailer chassis so as to control the non-driving axle of a trailer and cause that trailer axle to move in the same direction as the direction being taken by the towing vehicle.

BACKGROUND OF THE INVENTION

In modern transport, trailers are used with tow vehicles. Some of these trailers are used as commercial vehicles for the transport of freight, while others are house trailers or other varieties of private use vehicles. Manufacturers must address many problems in designing and mounting axles on these non-driving trailers. Addressing these problems successfully can be very complex in that it is necessary to consider two dissimilar masses, one mass being governed by springs while the other is not. It is the coupling between these two masses which causes the real problem. The mass governed by springs needs to move vertically as little as possible in order to avoid careening and lurching while at the same time that mass must be joined to the mass that is not governed by springs. It should be understood that the center of gravity of the mass influenced by springs is capable of being located in various positions in relation to the various axles.

Many methods employing shock absorbers and springs are known in the art for making operations easier for the mass governed by springs. Furthermore, many methods of reducing sideward motion of this mass are known in the art. Unfortunately, none of the known art provides a method by which the lateral forces generated when the vehicle goes around a curve may be utilized such that the non-driving axle may be reoriented so as to follow the direction taken by the towing vehicle while simultaneously making operations of the trailer safe by limiting lateral movement.

SUMMARY OF THE INVENTION

Accordingly, it is the primary object of the present invention to provide a device for limiting lateral movement in trailers such that by selective application of the forces present during turning operations the non-driving axles of a trailer can be reoriented so as to follow the direction of travel established by the towing vehicle. The present invention achieves this objective by connecting the trailer's non-driving axle to the chassis in two ways. During forward motion, the slewing that is turning brackets are parallel to the direction of motion, which brackets push or pull the axle in that direction. The lateral movement is controlled by side links, which links are fastened to the chassis or body as well as being fastened to the non-driven axle via a pin or pivotal joint. This pin or joint is placed so as to be behind the axle relative to the principal direction of travel.

The lateral force generated by the wheels' contact with the road translates into a force between the axle and the pin, which force can impart a turning motion to the wheel axle relative to the chassis or body when the vehicle turns. This turning of the axle causes inertia in the trailer and its load and tends to move them in the direction the vehicle is traveling. Equilibrium is established when these forces and moments equal those located in the slewing bracket's bushing.

The force generated between the axle's midpoint in the pins thus illustrates the principle upon which the present invention is based. It is possible to control the degree of influence the lateral forces will have by selecting the slewing bracket bushing based on its relative flexibility.

Furthermore, the present invention makes it possible to construct long trains of towed vehicles which can take curves without the last pair of wheels swaying back and forth over the road. Thus controlling the lateral motion, the present invention provides a method of transport that is more logical and less dangerous than the methods currently being utilized.

BRIEF DESCRIPTION OF THE DRAWINGS

Further objects and advantages of this invention will become more apparent and more readily appreciated from the following detailed description of the present invention, taken in conjunction with the accompanying inventions, which:

FIGS. 1 and 2 show a typical towing operation with a vehicle pulling a trailer;

FIG. 2 depicts the same vehicle as it turns;

FIGS. 3A and 3B separate the parts of the trailer and indicate force components acting on the various parts;

FIGS. 6A and 6B show an engineering drawing of an axle illustrating its connection to the chassis;

DETAILED DESCRIPTION OF THE PREFERRED EMBODIMENT

Figure 4A:
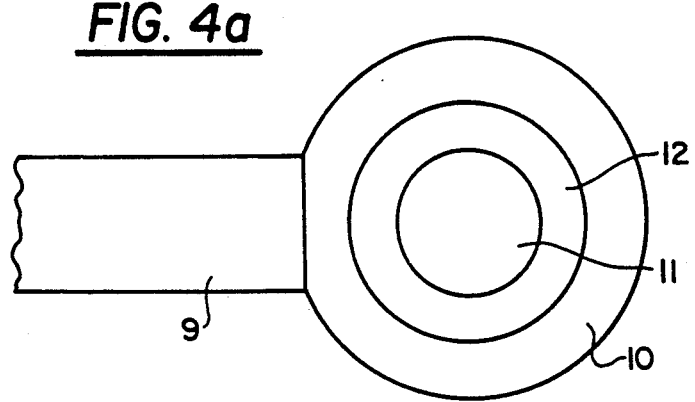
FIGS. 4A and 4B show the end of a slewing bracket with a bushing.

FIGS. 1 through 3 are used as illustration of the circumstance to which the present invention is directed. A vehicle 1, schematically indicated, tows a trailer 2. Between them is a towing bar 3. In FIG. 1 the vehicle is moving forward in the direction of the arrow. When it takes a curve, as is shown in FIG. 2, inertial forces arise. The wheel casings 50 on the trailer are indicated in FIG. 2.

Inertial forces are caused by any turning of the load and chassis. These forces arise and act on the mass carried by the spring 5 when the vehicle turns. The wheels and axles 4 are not directly driven and are in contact with the road such that the inertial forces created in turning are counteracted. In other words, the frictional force between the wheel tracks and the road drives the mass carried by the spring in the direction taken by the towing vehicle such that the forward force exerted by the towing bar is of great importance. In FIG. 3A the wheels and axles 4 are set beside FIG. 3B the mass influenced by springs 5 so as to illustrate the different forces acting upon each. The object of the present invention is to connect together the wheels and axle with the chassis employing slewing brackets in such a way as to cause the wheels to be guided in the direction taken by the towing vehicle, which direction is indicated by the towing bar 3.

The coupling of the wheel and the chassis with the cargo is also done with slewing brackets. These are closed off with joints so that the trailer's cargo will be able to move vertically in a resilient way. A shock absorber is used to diminish the force of the movements. The vertical movements are of no concern to the present invention in that many methods are known in the art for dealing with such movement. The entire coupling procedure can therefore be indicated schematically and in the model it is simplified so that the principle of the invention is clearly set forth.

Figure 4B:
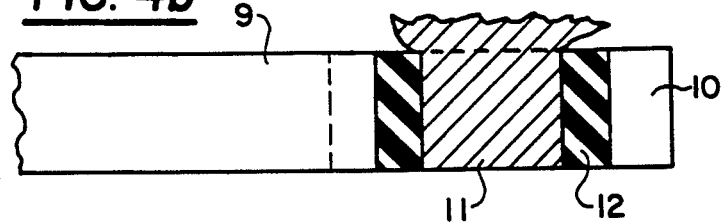

An important part of the coupling between the masses influenced by the springs and the other masses is the bushing for the slewing bracket, which is illustrated in FIGS. 4A and 4B. The slewing bracket 9 ends in a ring 10. The ring surrounds a plug 11. Between the inside of the ring and the plug is a flexible bushing 12, which bushing will also reduce the need of lubrication. The slewing bracket is placed around the plug and will be able to move so that the axle and chassis are so connected to one another that the load is confined to the vertical direction. The bushing 12 is often made of hard rubber, but other materials can be used within the limits of the following invention.

Figure 5A:
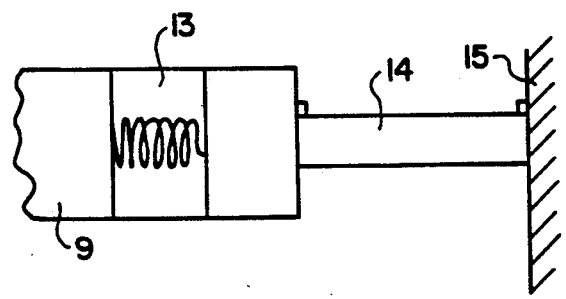
FIGS. 5A and 5B illustrate the operation of the slewing bracket and bushing combination.
Figure 5B:
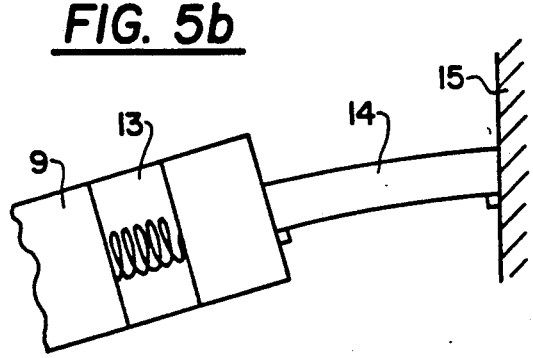

The bushing's flexibility allows for compression and bending. This compression and bending is illustrated in FIGS. 5A and 5B. The slewing bracket 9 is connected, for example, between the chassis 15 and the plug 11 of FIGS. 4A and 4B. A bending around the plug is met by the plate spring 14. Pressure on the joint of the slewing bracket is met by a spiral spring 13 pointed in the same direction as the slewing bracket. This description will be used to explain how slewing brackets and bushings can be utilized so as to connect the axle to the chassis so as to permit operation according to the principles upon which the present invention is based.

FIGS. 6A and 6B show the connection of the chassis as to a non-driven and unguided axle 20. The axle 20 is fastened to a cradle 21. The cradle is resiliently joined to the chassis 23 over two spring packets 22. The spring packets are not included in the invention, and can be conventional air spring systems or spring systems with spiral springs. Those skilled in the art may be familiar with many variations of spring packets.

For reasons of space in this example, it was found appropriate to place the chassis coupling down by the axle cradle. Thus there is a chassis pin 24 under the chassis itself. From this pin or dowel 24, a slewing bracket 25 extends on each side of the vehicle. The pin or dowel 24 and the slewing bracket are resiliently connected utilizing the pin and ring arrangement more fully described in connection with FIGS. 4A and 4B. The slewing bracket 25 is connected by a pin 26 to the cradle 21. This connection is likewise made utilizing the pin and ring arrangement. The latter pin is located in front of the axle 20. The traction force thrusts are communicated from the pin 24 to the chassis.

Figure 7:
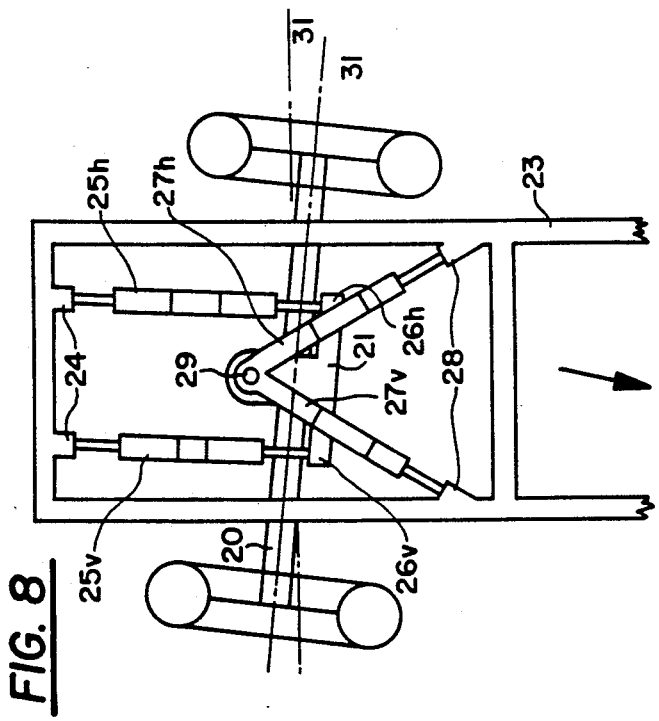
FIG. 7 shows a schematic view of the bushings and the slewing brackets.
Figure 8:
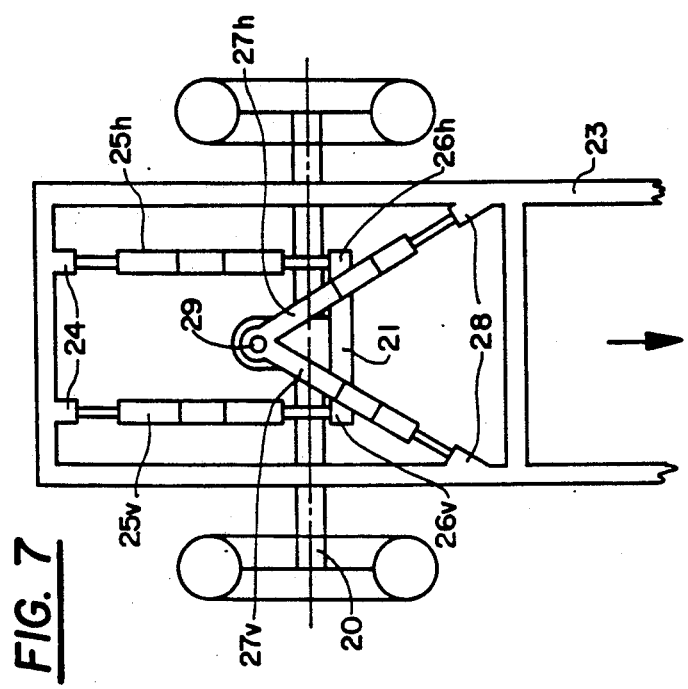
FIG. 8 shows the bushings and steering brackets as the same vehicle turns.

FIGS. 7 and 8 depict like parts with like numbers. The axle 20, to which the wheels 51$v$ and 51$h$ are attached, is forward of two slewing brackets 25$v,h$ which brackets project from the connecting points defined by pin 24 on the chassis 23. The connection between the chassis and the brackets are made utilizing a ring and pin arrangement as shown in FIGS. 4A and 4B. The axle 20 is fixedly mounted to a cradle 21 by any known method. The slewing brackets 25$v,h$ are connected to the cradle 21 by the pins 26$v,h$, one on the left and the other on the right side, respectively. The connection between the brackets and the cradle are likewise made utilizing a ring and pin arrangement. Thus connected, it is possible for the axle 20 to both move forward as well as to turn relative to the chassis. The shift in the axial pin takes place through bending in the bushings surrounding the axial pins 24 and 26$v,h$, which allows that the plate springs, when employed, to move in that direction. A turning of the axle 20 relative to the chassis 23 will cause pressure on one side's spiral spring and a pushing out on the other side's. Two spiral springs 32, one for each bushing, are illustrated in the drawings as one, pointing in the direction of the slewing bracket 25 $v,h$. One skilled in the art will understand that this is an uncertain and swaying coupling between the axle and the chassis.

A characteristic of the invention is that it brings about a stabilizing centering of the axle 20. This is done by means of two slewing brackets 27$v,h$ both of which are connected through holes in their end points to a pin 29 pivotally connected to the cradle 21. The slewing brackets 27$v,h$ are connected to and extend from each side of the chassis at the points 28. This connection is made utilizing a ring and pin arrangement as illustrated in FIGS. 4A and 4B. They form a rigid angle. Experimentation has indicated that an angle of about 60 degrees works well. The connecting shafts of the bracket 27$v,h$ end on the chassis where its bushing is, which can be generalized with a plate spring and spiral spring as shown in FIGS. 7 and 8. When the vehicle is towed straight ahead the pin 29 is held principally in the center of the vehicle. The cradle 21 can move up and down since the slewing bracket 27$v,h$ are nearly horizontal as is shown in FIG. 6. This gives a smooth ride to the mass governed by springs.

A distinguishing characteristic of the invention is the location for the pivot pin 29, which is pivotally connected to the cradle 21. The fastening to the cradle is located behind the axle relative to the principal direction of travel. The pin's axial direction crosses the axle substantially in the center between the wheels. The distance between these directions is indicated by the moment arm 30 which characterizes the invention and which is more clearly illustrated in FIG. 9$a,b$. The central location of the pivot pin 29 relative to the axle as depicted in FIGS. 7 and 8 prevents large translational movements of the axle 20 away from the axle's original location. It is to be noted in FIG. 8 that the bushings are provided so as to be flexible enough to permit movement in both steering function of slewing brackets 27$v,h$ caused by rotation of the axle 20.

When the vehicle turns, as in FIG. 8, the inertia force exerted on the chassis and its load would tend to move them both in a direction being opposite to the direction being taken by the towing vehicle. That inertial force is transferred to the axle through the pivot pin 29 and slewing brackets 25$v,h$. The axle in turn may be forced closer to the ground. This causes the momentary appearance of a turning force around the point where the wheel touches the ground. That force will push the axle in the same direction as the towing vehicle. Since the wheel is rolling the whole time, some sliding of the wheel over the ground would be expected when the wheel is shifted and turns the vehicle. The entire turning motion is counteracted by the slewing brackets 25, which brackets also transfer the forward moving force to the towed chassis from the towing vehicle. The spiral spring in the bushing model is what works against the turning of the force of inertia. A state of equilibrium is reached when the inertial force's known mass $mv^2/R$, where m=mass, v=velocity and R=—curve radius automatically fixes the angular adjustment of the axle, where, as one skilled in the art will understand, the sliding of the tire also plays a role in reaching equilibrium.

Figure 9A:
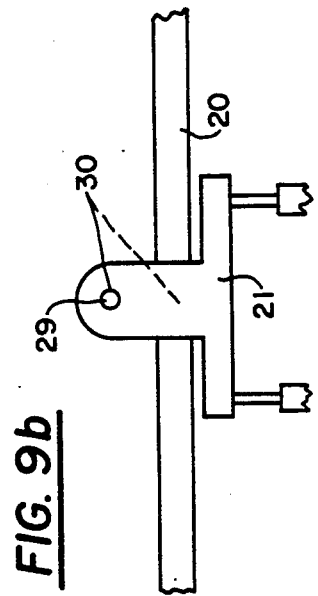
FIGS. 9A and 9B depict the cradle so as to more clearly illustrate its location and moment arm.
Figure 9B:
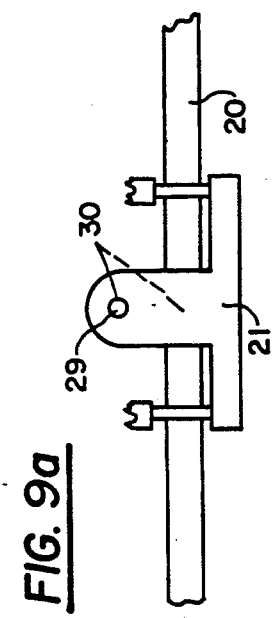

In FIGS. 9a and 9b the cradle 21 is illustrated separately so as to show more clearly the moment arm 30 and two possible methods of attaching the cradle 21 to the slewing brackets 25v and 25h. Those skilled in the art will recognize many ways in which the cradle may be firmly attached to the axle 20. One preferred combination would be to have the cradle 21 being subject to a compressive force exerted by the slewing brackets 25v and 25h. The moment arm 30, which should be at least 15 centimeters long, is clearly shown. The same control of the inertial forces is achieved even if the slewing brackets 25 are pulling, as is shown in FIG. 9b. If the pin or link 29 is placed over the axle 20, then the lateral movement control being sought by the present invention could not be achieved as a result of being deprived of a moment arm 30.

One skilled in the art will understand that there are limits to the flexibility of the plate spring as drawn, and of the spiral springs. If a heavy weight is on the bushing with some freedom of movement the bushing becomes stiff. The kinds of spring used in the Figures are, of course, not used in practice, but they give a clear picture of what can occur with a bushing of rubber. Those skilled in the art will certainly be able to choose the degree of flexibility and accordingly control what happens with the pins with a left or sidewise turning arm. This choice is to be made in connection with the choice of the quality of the tire.

The specialist will understand that the angle of the axle 30 as illustrated in FIG. 8 is exaggerated so as to make the illustration clear. What is distinctive in the method of the present invention is that the pin 29 essentially is held in the center of the vehicle by the control arms 27 and that the pin is located to the rear of the axle in the vehicle's principal direction of travel.

While only a few exemplary embodiments of this invention have been described in detail, those skilled in the art will readily appreciate that many modifications are possible in the preferred embodiments without materially departing from the novel teachings and advantage of this invention. Accordingly, all such variations and modification are intended to be within the true spirit and valid scope of the invention as defined by the following claims.

What is claimed is:

1. A device for connecting a wheel axle of a towed vehicle to the vehicle body to compensate for inertial forces while turning, the vehicle body having a longitudinal axis, the device comprising:
   mounting means for resiliently connecting the axle to the vehicle body, said mounting means including pivot means located intermediate the ends of the axle for pivotably mounting said axle for relative movement about a substantially vertical axis, and
   first and second bracket means each having first and second ends, each of said first ends being connected by connection means to the body in spaced apart relation on opposite sides of said pivot means, said connection means including a resiliently deformable member carried by one of said first ends and said body and a pin engaged by said resiliently deformable member, said pin being carries by the other of said first ends and said body, each of said second ends being connected to said mounting means on opposite sides of said pivot means,
   said vertical axis of said pivot means being offset a selected distance along the longitudinal axis of the vehicle from said axle relative to the direction of movement of the vehicle to establish a moment arm responsive to inertial forces while turning to rotate said axle about said vertical axis.

2. A device for connecting a wheel axle of a towed vehicle to the vehicle body as in claim 1, wherein said selected distance for offsetting said pivot means along the longitudinal axis of the vehicle is at least 15 centimeters.

3. A device for connecting a wheel axle of a towed vehicle to the vehicle body ad in claim 1, wherein said pivot means is offset along said longitudinal axis of the vehicle so that said pivot means is behind said axle relative to the principal direction of travel.

4. A device for connecting a wheel axle of a towed vehicle to the vehicle body as in claim 1, wherein said pivot means is offset along said longitudinal axis of the vehicle so that said pivot means is forward of said axle relative to the principal direction of travel.

5. A device for connecting a wheel axle of a towed vehicle to the vehicle body as in claim 1, said device further comprising a third and fourth bracket means each having first and second ends, each of said first ends being connected to the body in spaced apart relation on opposite sides of said pivot means, each of said second ends being connected to said mounting means about said pivot means.

6. A device for connecting a wheel axle of a towed vehicle to the vehicle body as in claim 5, wherein said first, second, third and fourth bracket means comprising an arm, each having said first and second ends, each of said ends having a ring member for engaging about a connection pin and an annular, resilient bushing member disposed between said ring member and connection pin.

7. A device for connecting a wheel axle of a towed vehicle to the vehicle body as in claim 6, wherein each of said first, second, third and fourth arms further includes a plate spring disposed in proximity to said first end and spring means disposed in proximity to said second end.

8. A device for connecting a wheel axle of a towed vehicle to the vehicle body as in claim 5, wherein said third and fourth bracket means are connected to said mounting means such that an enclosed angle of 60 degrees is provided therebetween.

9. The device as claimed in claim 1, wherein said resiliently deformable member is a flexible bushing.

* * * * *